US012650822B2

(12) United States Patent
Chmielewski et al.

(10) Patent No.: US 12,650,822 B2
(45) Date of Patent: Jun. 9, 2026

(54) SCRIPT-BASED RUNTIME ASSEMBLY OF OBJECT GRAPHS USING NATIVE INSTRUCTIONS COMPILED BY AN AHEAD-OF-TIME COMPILER

(71) Applicant: Oracle International Corporation, Redwood Shores, CA (US)

(72) Inventors: Michal Chmielewski, Marina, CA (US); Murali Pottlapelli, Chino, CA (US); Yogesh Kumar, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 243 days.

(21) Appl. No.: 18/475,075

(22) Filed: Sep. 26, 2023

(65) Prior Publication Data

US 2025/0103309 A1 Mar. 27, 2025

(51) Int. Cl.
| | |
|---|---|
| *G06F 9/44* | (2018.01) |
| *G06F 8/41* | (2018.01) |
| *G06Q 10/101* | (2023.01) |

(52) U.S. Cl.
CPC ........... *G06F 8/433* (2013.01); *G06Q 10/101* (2013.01)

(58) Field of Classification Search
CPC .............................. G06F 8/433; G06Q 10/101
See application file for complete search history.

(56) References Cited

U.S. PATENT DOCUMENTS

| | | | | |
|---|---|---|---|---|
| 2011/0264666 A1* | 10/2011 | Gieseke | .............. | G06F 16/2228 |
| | | | | 707/E17.085 |
| 2018/0005186 A1* | 1/2018 | Hunn | ..................... | G06T 11/206 |
| 2021/0026663 A1* | 1/2021 | Ferraro | ..................... | G06F 8/41 |
| 2021/0232770 A1* | 7/2021 | Lin | ......................... | G06N 20/00 |
| 2024/0296107 A1* | 9/2024 | Todirel | ............... | G06F 11/3632 |

FOREIGN PATENT DOCUMENTS

CN 105335156 A 2/2016

OTHER PUBLICATIONS

"Concept—Dependency Injection and ObjectGraphs", Retrieved from https://support.intershop.com/kb/index.php/Display/Q23740, Retrieved on May 12, 2023, pp. 1-9.
"Generating and Compiling Source Code from a CodeDOM Graph", Retrieved from https://learn.microsoft.com/en-us/dotnet/framework/reflection-and-codedom/generating-and-compiling-source-code-from-a-codedom-graph, Sep. 15, 2021, pp. 1-5.

(Continued)

*Primary Examiner* — Qamrun Nahar
(74) *Attorney, Agent, or Firm* — Invoke

(57) ABSTRACT

Techniques for script-based runtime assembly of object graphs using native instructions compiled by an ahead-of-time compiler are disclosed, including: generating, based on a data structure that defines a business process, a script including instructions for assembling an object graph that represents relationships between objects used by the business process; obtaining, at runtime by a business process execution engine compiled to native instructions by an ahead-of-time compiler, the script; assembling, at runtime by the business process execution engine, the object graph based at least on the instructions in the script.

20 Claims, 9 Drawing Sheets

(56) References Cited

OTHER PUBLICATIONS

GitHub—galan/verjson: A Java serializer for evolving data-structures, Retrieved from https://github.com/galan/verjson. Retrieved on May 12, 2023, pp. 1-4.
"Grapher", Retrieved from https://github.com/google/guice/wiki/Grapher, Jan. 16, 2020, pp. 1-4.
"Storing object-graphs with class-evolution in Java with transformation (long time archiving)", Retrieved from https://softwareengineering.stackexchange.com/questions/218767/storing-object-graphs-with-class-evolution-in-java-with-transformation-long-tim, Retrieved on May 12, 2023, pp. 1-5.
"The stack and stack frames in a low level language", Retrieved from https://stackoverflow.com/questions/10824364/the-stack-and-stack-frames-in-a-low-level-language, Retrieved on May 12, 2023, pp. 6.

"Using graphs, states, and machines to script", Retrieved from https://docs.unity.cn/Packages/com.unity.visualscripting@1.5/manual/vs-graphs-machines-macros.html, Retrieved on May 12, 2023, pp. 3.
"Using the CodeDOM", Retrieved from https://learn.microsoft.com/en-us/dotnet/framework/reflection-and-codedom/using-the-codedom, Sep. 15, 2021, pp. 1-4.
Attali et al., "Graphical Visualization of Java Objects, Threads, and Locks", IEEE Distributed Systems Online, 2001, pp. 17.
Michail et al., "JGraphT—A Java Library for Graph Data Structures and Algorithms", ACM Transactions on Mathematical Software, vol. 46, No. 2, Article 16, May 2020, pp. 1-28.
Sipek et al., "Enhancing Performance of Cloud-based Software Applications with GraalVM and Quarkus", 3rd International Convention on Information, Communication and Electronic Technology (MIPRO), 2020, pp. 6.

* cited by examiner

Class File 200

Virtual Machine Memory Layout
300

Figure 5:
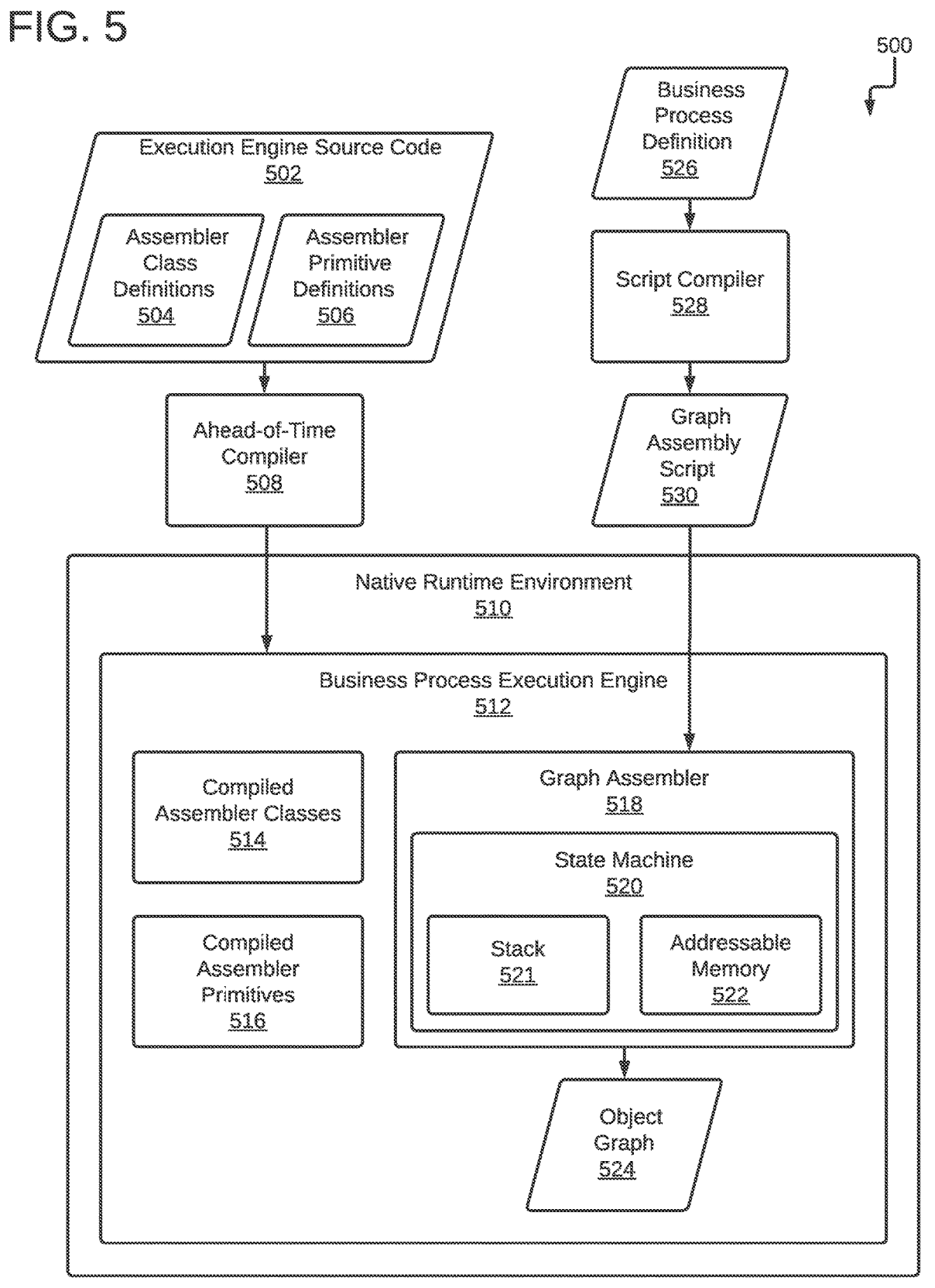

Business Process Definition
526

↓

Script Compiler
528

↓

Graph Assembly Script
530

Execution Engine Source Code
502

Assembler Class Definitions
504

Assembler Primitive Definitions
506

↓

Ahead-of-Time Compiler
508

↓

Native Runtime Environment
510

Business Process Execution Engine
512

Compiled Assembler Classes
514

Compiled Assembler Primitives
516

Graph Assembler
518

State Machine
520

Stack
521

Addressable Memory
522

↓

Object Graph
524

SCRIPT-BASED RUNTIME ASSEMBLY OF OBJECT GRAPHS USING NATIVE INSTRUCTIONS COMPILED BY AN AHEAD-OF-TIME COMPILER

TECHNICAL FIELD

The present disclosure relates to object graphs. In particular, the present disclosure relates to assembling object graphs at runtime.

BACKGROUND

In computer programming and software development, a business process refers to a computer-implemented series of structured, interconnected tasks or activities that are designed to achieve a specific business goal or objective. These processes can involve various operations, data manipulations, and interactions with external systems or users. For example, computer-implemented business processes may be used for employee onboarding, expense reporting, customer relationship management (CRM), inventory management, invoice processing, supply chain management, customer support, marketing campaigns, financial reporting, data backup and recovery, human resources and payroll processing, quality control and testing, online order processing, document generation and approval workflows, information technology (IT) service management, credit card processing, healthcare claims processing, manufacturing processes, hotel reservation systems, educational enrollment, etc.

Various languages exist for defining business processes. For example, Business Process Execution Language (BPEL) is a standardized language used to define and execute business processes within a service-oriented architecture (SOA). BPEL is an extensible markup language (XML) based language that allows the modeling and execution of business processes that involve interactions between different services and systems. BPEL and other business process definition languages are not executable by themselves, and executing a business process typically requires generating some kind of executable representation of the business process definition.

Computer systems that execute business processes are often required to balance performance, extensibility, and security. For example, the Java Runtime Environment supports code extensions (e.g., introducing new business process definitions at runtime) using class loaders and serialization/deserialization. When a class loader is present, Java source code corresponding to a business process can be compiled to a class file and stored in a Java archive (JAR) file; the class loader can then load the class into a running Java process. With serialization/deserialization, the running Java process can open a serialized object input stream to obtain a previously saved Java object graph corresponding to the business process.

Code extension using class loaders and/or serialization/deserialization is not always available. Loading new code into a running process runs the risk of introducing malicious and/or malformed code, and therefore may be restricted or prohibited based on a security policy. In addition, class loaders and serialization/deserialization are not available if the code that executes the business processes is compiled to native instructions. For example, to help improve system performance, Java code can be compiled to native instructions using an ahead-of-time (AOT) compiler such as the Graal AOT compiler. The Graal AOT compiler scans the entire code of the program, computes a closure of all the code that is transitively used, prunes the methods and classes that are not used, and then compiles a native binary for a target platform (e.g., armv6, AMD64, MacOS, Windows, etc.). The resulting native instructions do not include a Java Virtual Machine (JVM) and lack both a class loader and object serialization/deserialization facilities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment and mean at least one. In the drawings:

FIG. 5 illustrates a system in accordance with one or more embodiments;

DETAILED DESCRIPTION

Figure 1:
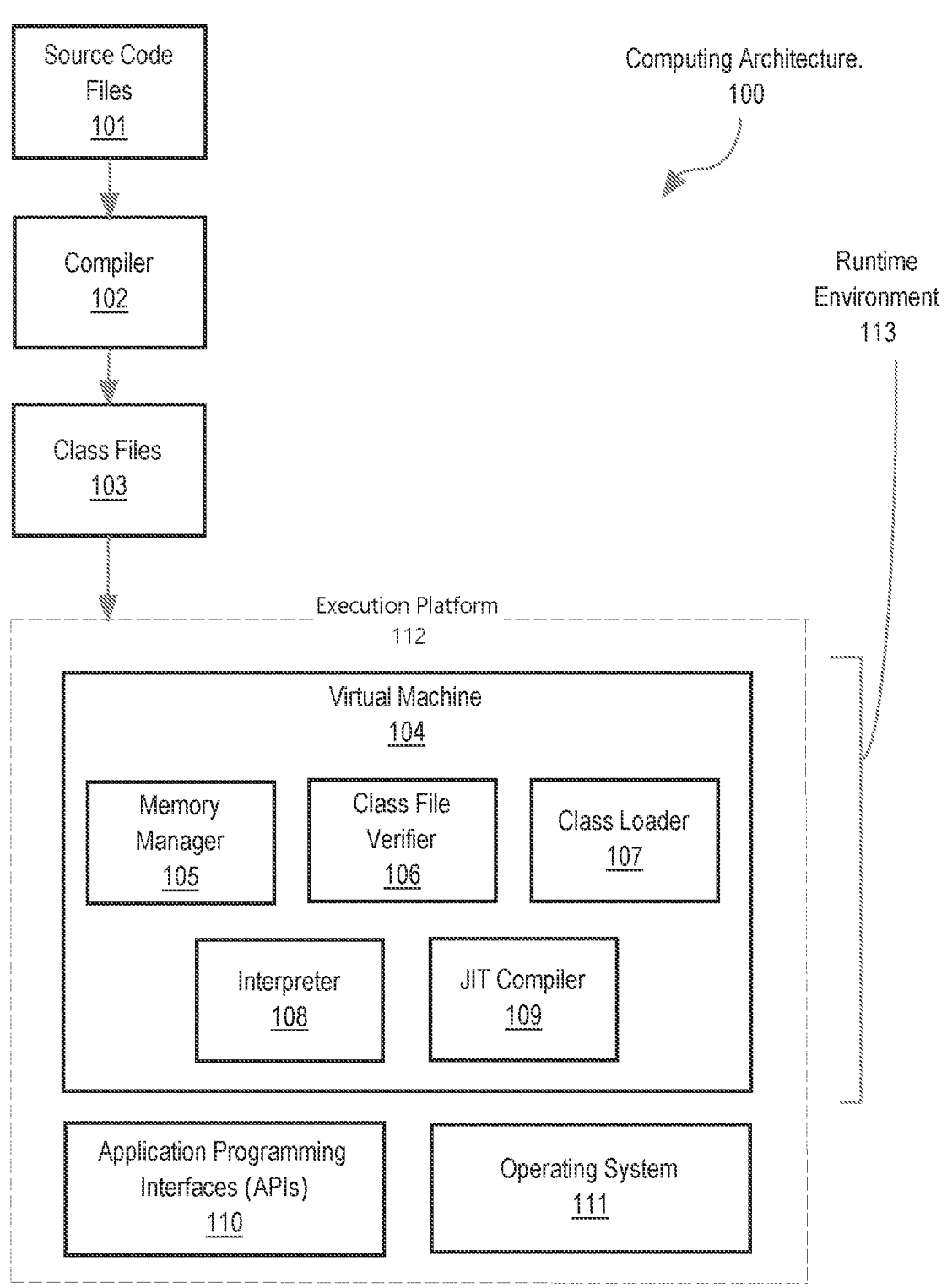
FIG. 1 illustrates an example computing architecture in which techniques described herein may be practiced.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

1. GENERAL OVERVIEW
2. ARCHITECTURAL OVERVIEW
   2.1. EXAMPLE ARCHITECTURE
   2.2. EXAMPLE CLASS FILE STRUCTURE
   2.3. EXAMPLE VIRTUAL MACHINE ARCHITECTURE
   2.4. LOADING, LINKING, AND INITIALIZING
3. EXAMPLE SYSTEM
   3.1. SYSTEM COMPONENTS
   3.2. DATA STORAGE
   3.3. USER INTERFACE
   3.4. TENANTS
4. SCRIPT-BASED RUNTIME ASSEMBLY OF OBJECT GRAPHS USING NATIVE INSTRUCTIONS COMPILED BY AN AHEAD-OF-TIME COMPILER

5. EXAMPLE EMBODIMENTS
    5.1. INTERNAL STATE MACHINE
    5.2. GRAPH ASSEMBLY SCRIPT SYNTAX
    5.3. ASSEMBLER PRIMITIVES
    5.4. EXAMPLE SCRIPTS
    5.5. OBJECT GRAPHS
6. PRACTICAL APPLICATIONS, ADVANTAGES, AND IMPROVEMENTS
7. COMPUTER NETWORKS AND CLOUD NETWORKS
8. MICROSERVICE APPLICATIONS
    8.1. TRIGGERS
    8.2. ACTIONS
9. HARDWARE OVERVIEW
10. MISCELLANEOUS; EXTENSIONS

1. General Overview

One or more embodiments assemble object graphs using graph assembly scripts, which allows for code extensions in the absence of class loaders and serialization/deserialization—for example, when using an AOT compiler that does not include those features in the compiled native instructions. A graph assembly script may be based on a business process definition. For example, the business process definition may be a BPEL document or other kind of document that defines a business process and adheres to an established syntax. One or more embodiments include a script compiler configured to generate a graph assembly script based on the business process definition. The graph assembly script includes instructions for generating an object graph corresponding to the business process definition, i.e., to reflect the graph of objects indicated by the business process definition. The instructions may take the form of primitives as described herein. Some examples of primitives are described in further detail below.

One or more embodiments include a graph assembler that is configured to use an internal state machine, with a stack and addressable memory, to process a graph assembly script and assemble an object graph. Specifically, the state machine may be configured to execute assembler primitives referenced by the script. In an embodiment, the assembler primitives do not include any labels, loops, or conditional statements. Thus, a graph assembly script cannot introduce any infinite loops, conditionals, or infinite goto's or jumps in the object graph assembly process—any of which could significantly impair system resources by introducing delays and consuming disproportionate computing resources. The graph assembly script may execute in a one-way flow, either top-to-bottom or bottom-to-top, thus helping to ensure that graph assembly will either complete or terminate in an error.

One or more embodiments described in this Specification and/or recited in the claims may not be included in this General Overview section.

2. Architectural Overview

2.1. Example Architecture

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilize the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
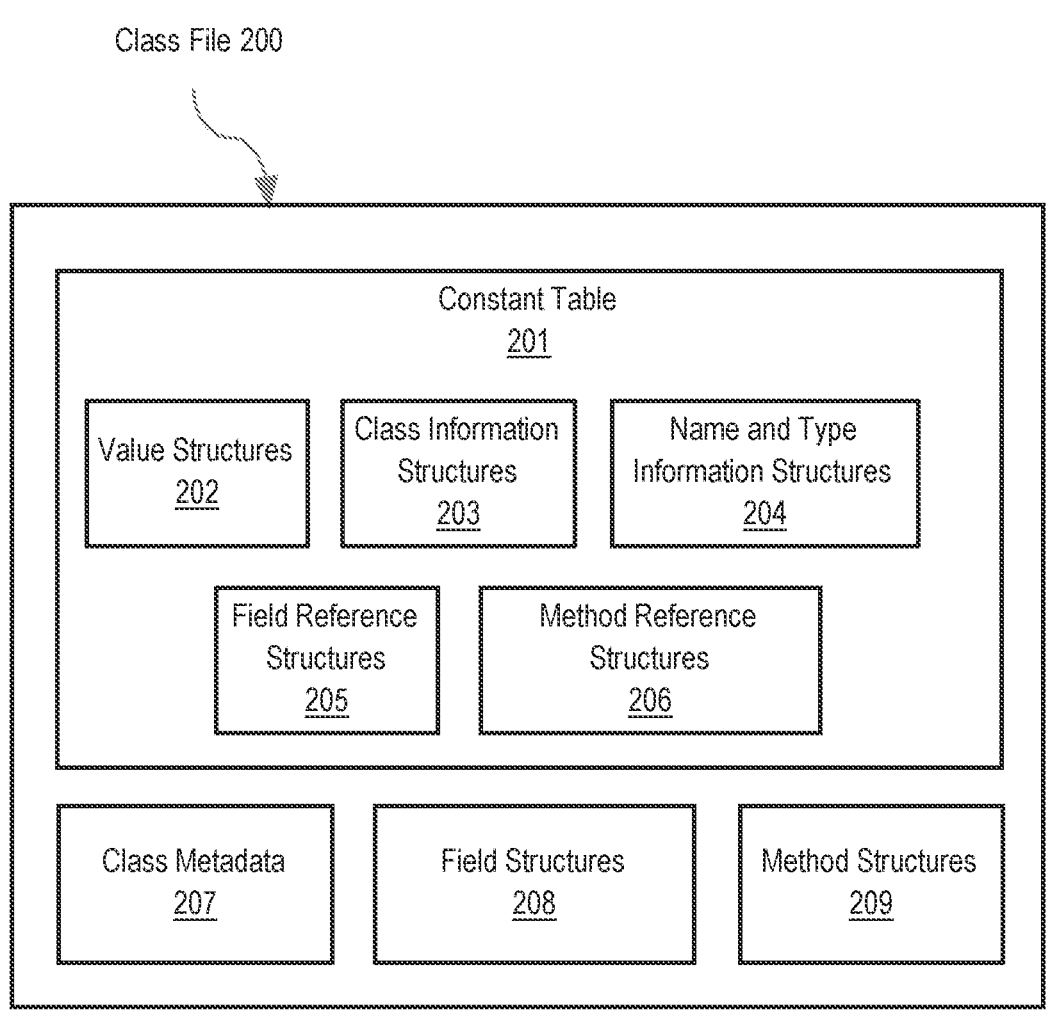
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
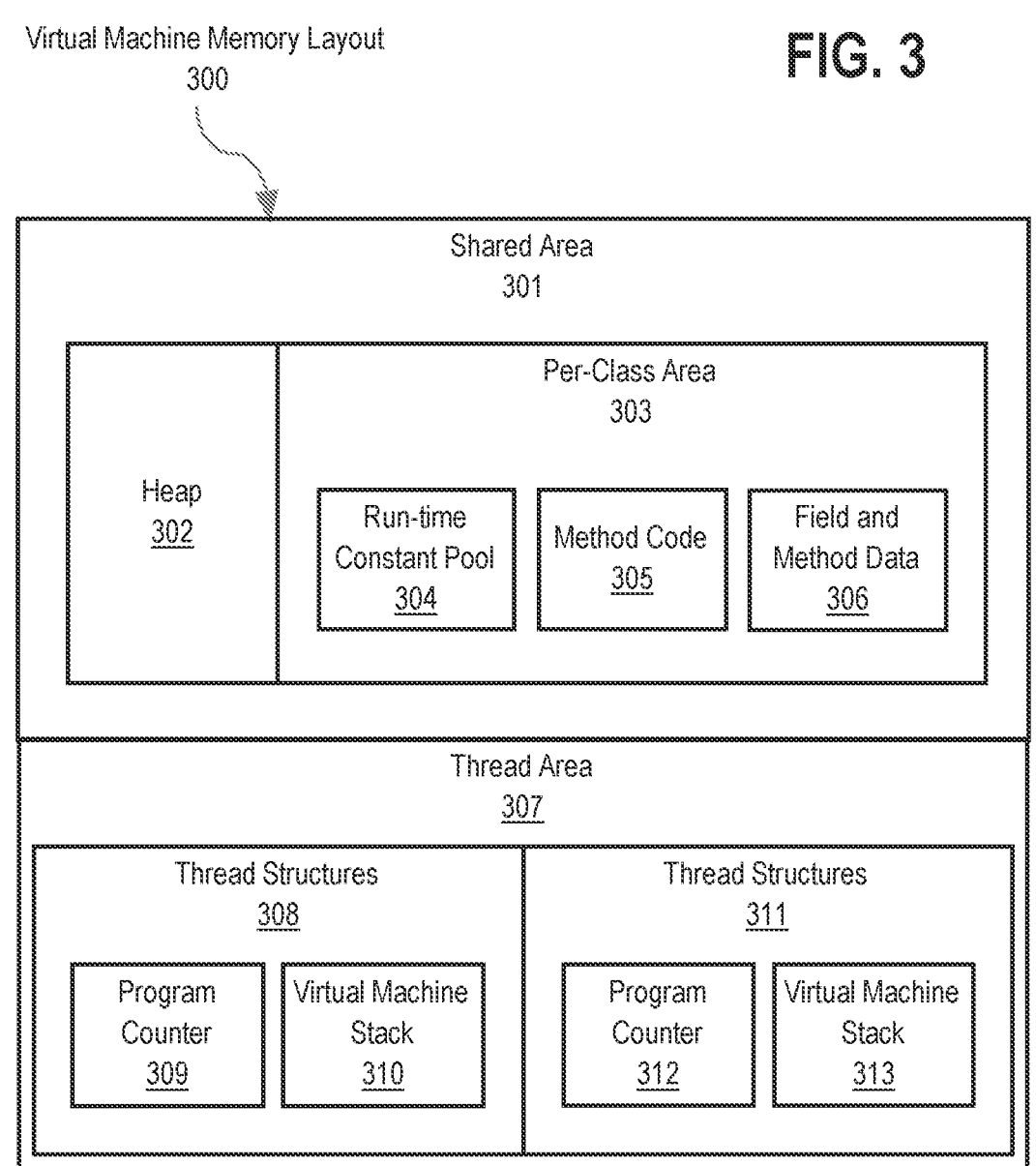
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
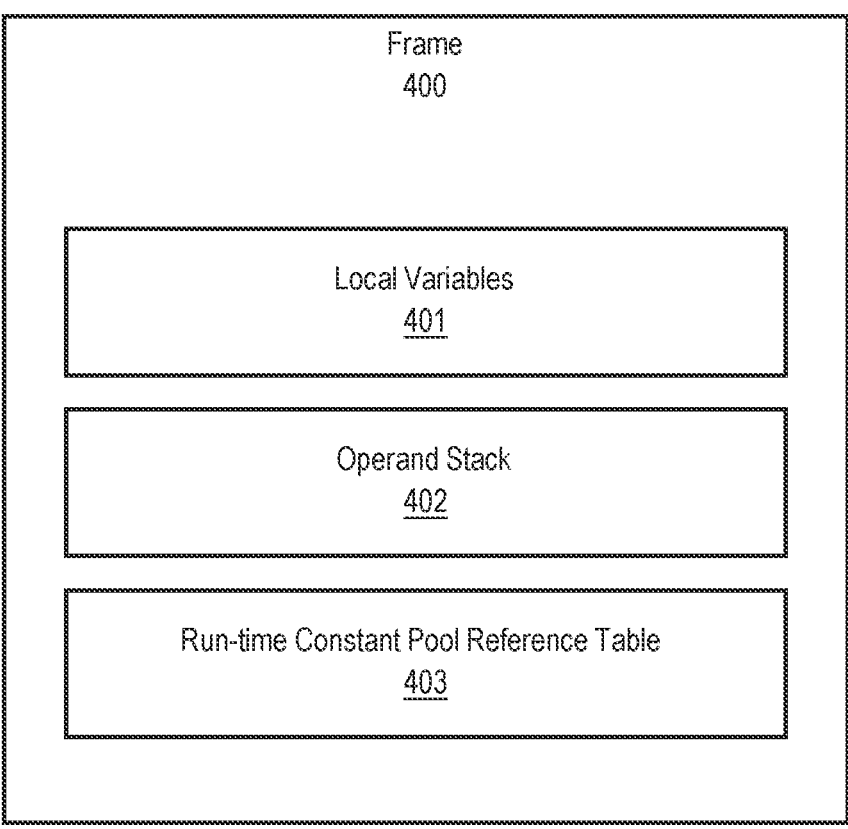
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/ fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/ method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Example System

3.1. System Components

FIG. 5 illustrates an example of a system 500 in accordance with one or more embodiments. As illustrated in FIG. 5, the system 500 includes execution engine source code 502, assembler class definitions 504, assembler primitive definitions 506, ahead-of-time (AOT) compiler 508, native runtime environment 510, business process execution engine 512, compiled assembler primitives 514, compiled assembler classes 516, graph assembler 518, state machine 520, stack 521, addressable memory 522, object graph 524, business process definition 526, script compiler 528, and graph assembly script 530. Each of these components is described in further detail below.

In an embodiment, the system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, system 500 includes hardware and/or software configured to perform operations for script-based runtime assembly of object graphs using native instructions compiled by an ahead-of-time compiler, examples of which are described below. Specifically, these operations may be performed by one or more components of system 500, as described in further detail herein.

In an embodiment, ahead-of-time compiler (AOT) 508 is configured to compile source code to native instructions before runtime. Native instructions, also known as machine instructions or assembly instructions, are low-level instructions that a computer's central processing unit (CPU) can directly execute. These instructions are encoded in binary format and are specific to the architecture of the CPU. Each type of CPU architecture has its own set of native instructions that it understands and can execute. In contrast, bytecode includes intermediate-level instructions that require a virtual machine to execute, as described in further detail above. A computing environment that executes native instructions may be referred to generally as a native runtime environment 510.

One or more embodiments use AOT compiler 508 to compile execution engine source code 502 into native instructions for a business process execution engine 512. Business process execution engine 512 is configured to execute business processes. Given a business process that includes interactions between multiple components (e.g., multiple program units, services, interfaces, etc.), business process execution engine 512 routes program execution through those components. Execution engine source code 502 includes code, written in a non-native programming language (e.g., Java), that defines how business process execution engine 512 operates.

In general, an object graph 524 is a data structure that represents a collection of objects (e.g., instances of classes) connected by references or pointers. These objects are organized in a way that reflects their relationships and dependencies, forming a network or graph-like structure. Specifically, as used herein, object graph 524 defines the relationships between objects used in a corresponding business process, connected in a way that describes the flow of the business process. Some examples of object graphs 524 are described in further detail below. Business process execution engine 512 is configured to use object graph 524 to execute the business process, by routing execution through the various objects as indicated by object graph 524.

As discussed above, when code is compiled to native instructions, class loaders and serialization/deserialization are not available. One or more embodiments are configured to assemble object graphs 524 using graph assembly scripts 530, which allows for code extensions in the absence of class loaders and serialization/deserialization—for example, when using an AOT compiler 508 that does not include those features in the compiled native instructions. A graph assembly script 530 is based on a business process definition 526. For example, business process definition 526 may be a BPEL document or other kind of document that defines a business process and adheres to an established syntax. A script compiler 528 is configured to generate graph assembly script 530 based on business process definition 526. Specifically, script compiler 528 is configured to parse business process definition 526, determine a graph of objects used in the business process as indicated by business process definition 526, and generate graph assembly script 530. Graph assembly script 530 includes instructions for generating an object graph 524 that corresponds to the business process definition 526, i.e., that represents the graph of objects indicated by the business process definition 526. The instructions may take the form of primitives as described herein. Some examples of primitives are described in further detail below.

Execution engine source code 502 may include assembler class definitions 504, i.e., source code that defines classes referenced by graph assembly script 530 and used by graph assembler 518 to assemble object graph 524. AOT compiler 508 compiles assembler class definitions 504 into compiled assembler classes 514. Because type information is lost when compiling source code to native instructions (for example, because Java reflection is not available when Java source code is compiled to native instructions), assembler class definitions 504 may include annotations that instruct AOT compiler 508 to preserve at least enough type information to allow business process execution engine 512 to access compiled assembler classes 514 by name. Alternatively, AOT compiler 508 may not preserve any type information; one or more embodiments may annotate the classes corresponding to business process execution engine 512 and any classes used to generate the object graph 524, and generate a set of peer classes that are used to create them.

Execution engine source code 502 may include assembler primitive definitions 506, i.e., source code that defines primitives referenced by graph assembly script 530 and used by graph assembler 518 to assemble object graph 524. AOT compiler 508 compiles assembler primitive definitions 506 into compiled assembler primitives 516. As used herein, assembler primitives are a basic instruction set that graph assembler 518 is configured to understand and execute to assemble an object graph 524. For example, assembler primitives may take the form of opcodes, as described in further detail below.

Business process execution engine 512 has an extensible architecture that allows for the introduction of additional business processes at runtime. Specifically, business process execution engine 512 includes graph assembler 518, which is configured to generate an object graph 524 based on a graph assembly script 530. Thus, business process execution engine 512 can be extended, at runtime, by reading in a new graph assembly script 530 and assembling a corresponding object graph 524 based on the graph assembly script 530.

In an embodiment, graph assembler 518 is configured to use a state machine 520 with a stack 521 and addressable memory 522 to process graph assembly script 530 and assemble object graph 524. State machine 520 may be an internal component of graph assembler 518, i.e., defined in the execution engine source code 502 and not an out-of-the-box component of the native runtime environment 510. An example of source code that uses an internal state machine 520 is described in further detail below.

In an embodiment, one or more components of the system 500 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3.2. Data Storage

In an embodiment, the system 500 includes a data repository (not shown in FIG. 5). A data repository is any type of storage unit and/or device (e.g., a file system, database, collection of tables, and/or any other storage mechanism) for storing data. The data repository may include multiple different storage units and/or devices. The multiple different storage units and/or devices may or may not be of the same type or located at the same physical site. The data repository may be implemented or executed on the same computing system as one or more other components of the system 500, and/or on a computing system separate from one or more other components of the system 500. The data repository may be communicatively coupled to one or more components of the system 500 via a direct connection or via a network.

3.3. User Interface

One or more features of the system 500 may be accessible via an interface (not shown in FIG. 5). In an embodiment, an interface refers to hardware and/or software configured to facilitate communications between a user and one or more components of the system 500. An interface renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of an interface are specified in different languages. The behavior of user interface elements is specified in a dynamic programming language, such as JavaScript. The content of user interface elements is specified in a markup language, such as hyper-text markup language (HTML) or XML User Interface Language (XUL). The layout of user interface elements is specified in a style sheet language, such as Cascading Style Sheets (CSS). Alternatively, an interface is specified in one or more other languages, such as Java, Python, C, or C++.

3.4. Tenants

In an embodiment, a tenant (not shown in FIG. 5) is a corporation, organization, enterprise, or other entity that accesses a shared computing resource, such as a shared business process. The system 500 may include multiple tenants that are independent from each other, such that a business or operation of one tenant is separate from a business or operation of another tenant.

Figure 6:
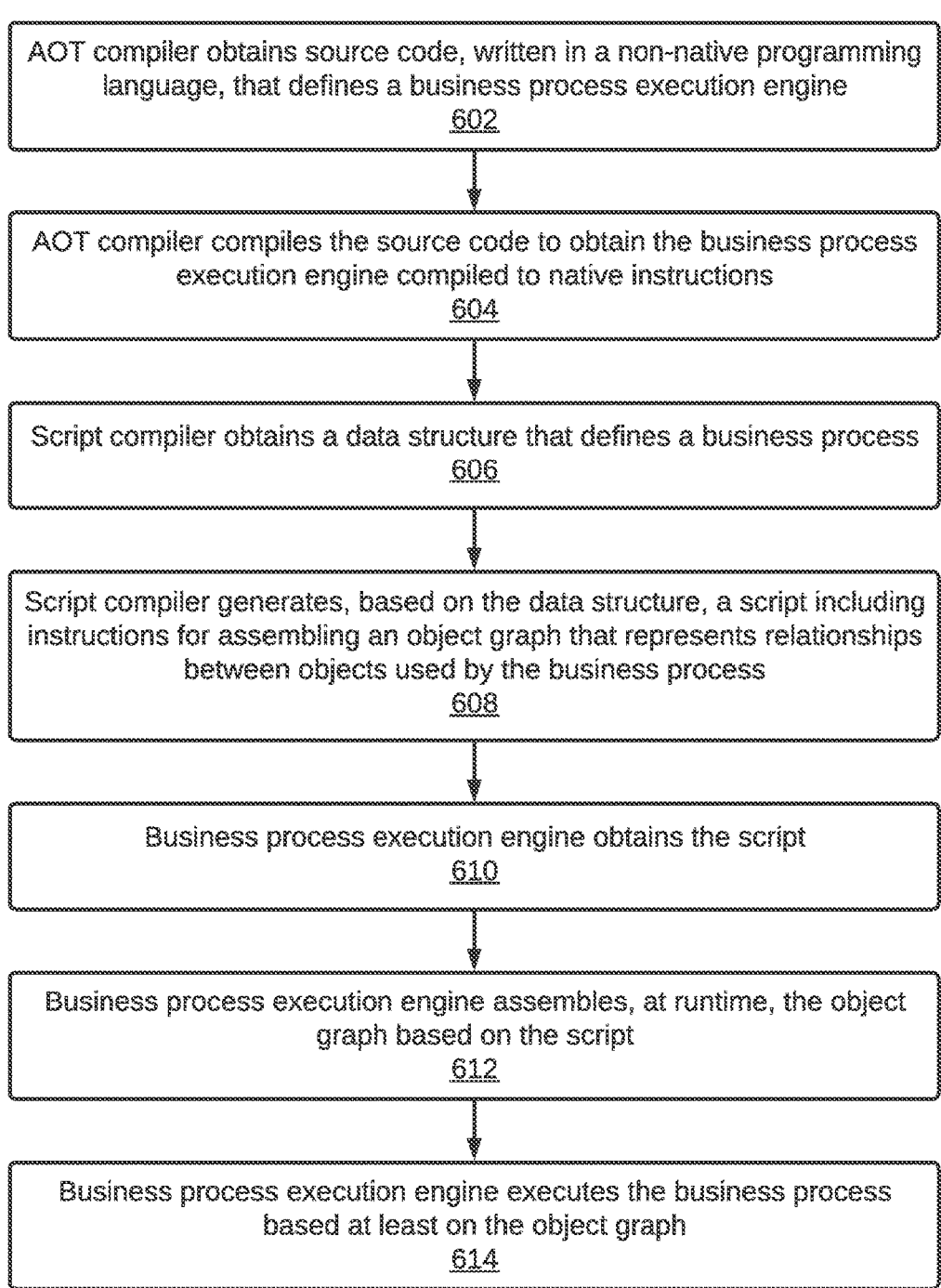
FIG. 6 illustrates an example set of operations for script-based runtime assembly of object graphs using native instructions compiled by an ahead-of-time compiler in accordance with one or more embodiments.

4. Script-Based Runtime Assembly of Object Graphs Using Native Instructions Compiled by an Ahead-of-Time Compiler FIG. 6 illustrates an example set of operations for script-based runtime assembly of object graphs using native instructions compiled by an ahead-of-time compiler in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, an ahead-of-time (AOT) compiler obtains source code, written in a non-native programming language, that defines a business process execution engine (Operation 602). For example, the source code may be written in Java or another language that would normally be compiled to bytecode, where class loaders and serialization/deserialization would be available at runtime. The AOT compiler compiles the source code to obtain the business process execution engine compiled to native instructions (Operation 604). When the source code is compiled to native instructions, class loaders and serialization/deserialization are no longer available at runtime. In an embodiment, the source code includes code for one or more script compilers. For example, the source code may include a set of code for compiling BPEL to graph assembly script and/or another set of code for compiling a CNCF graph to graph assembly script. Compiling the source code (Operation 604 above) may include compiling these script compilers to native instructions. References to script compilers, herein, may refer to the native compiled output of this process.

To generate a graph assembly script, in an embodiment, a script compiler obtains a data structure that defines a business process (Operation 606). For example, the data structure may be a BPEL document or another kind of document that defines a business process. Based on the data structure, the script compiler generates a script that includes instructions for assembling an object graph (Operation 608). Specifically, the object graph represents relationships between objects used by the business process.

One or more embodiments use the script at runtime to extend the business process execution engine. Specifically, in an embodiment, the business process execution engine obtains the script while executing at runtime (Operation 610). To obtain the script, the business process execution engine may execute instructions, compiled from source code to native code, that locate the script in storage and load it into the runtime. Still at runtime, the business process execution engine assembles the object graph based on the script (Operation 612). Specifically, a graph assembler may execute assembler primitives, referenced by the script, to generate the object graph. As discussed herein, the graph assembler may use an internal state machine to assemble the script.

In an embodiment, the business process execution engine executes the business process, based at least on the object graph (Operation 614). To execute the business process, the business process execution engine routes execution flow according to the relationships indicated by the object graph. In this manner, one or more embodiments are able to extend the still-running execution engine in the absence of class loaders and serialization/deserialization.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

5.1. Internal State Machine

As discussed above, one or more embodiments use an internal state machine to assemble an object graph based on a graph assembly script. The internal state machine may include a stack and addressable memory. One or more embodiments use the stack to perform reverse Polish notation (RPN) calculations, execute method calls, produce results, etc. The addressable memory may be a simple string key memory. For example, the addressable memory may be represented with the semantics of a map data structure. One or more embodiments use the addressable memory to store intermediate results, return results of computations to the calling code, etc. In addition, one or more embodiments use the addressable memory to provide object references to the graph assembly script from the calling code.

Table 1, below, shows an example of Java code that uses an internal state machine in accordance with one or more embodiments. For example, such code may be part of the execution engine source code.

TABLE 1

Using an Internal State Machine

```
try {
    final var loader = CodeLoader.getInstance( );
    final var sm = new LoaderSM( );
    sm.mem_store("ctx", ctx);
    sm.mem_store("proc", proc);
    sm.mem_store("cube_map", _map);
    sm.setHome( _proc.getContentRootPath( ) );
    final var root = _proc.getExtractContentRootPath( );
    final var path = root.resolve(_name);
    ICubeMap map = null;
    try {
        loader.load(sm, path );
        //
        map = sm.mem_fetch("cube_map");
    } finally {
    }
}
```

Here, "loading" refers to the process of loading code into the running program, i.e., extending the running program using script-based object graph assembly as described herein. Specifically, the code in the above example performs the following operations:

Gets an instance of the CodeLoader.

Gets a new state machine, LoaderSM, which includes the stack and memory.

Provides three Java objects (ctx, proc, and cube_map) to the code graph assembler (CGAssembler) script.

Determines where the script is located.

Executes loader.load(sm, path) to begin the loading process.

Fetches the cube_map object back from the loader memory.

5.2. Graph Assembly Script Syntax

As discussed above, assembler primitives may take the form of opcodes. Table 2, below, shows an example of a graph assembly script syntax in accordance with one or more embodiments. In this example, any text on a given line that follows a semicolon (whether at the beginning of the line or farther along in the line) is a comment that is ignored. An opcode may be followed by an operand. In an embodiment, not all opcodes require operands.

TABLE 2

Graph Assembly Script Syntax

```
; comment
opcode [operand]
opcode [operand] ; comment
```

In an embodiment, when an operand is present, its semantics are similar to those of JavaScript object notation (JSON) simple object types. These include:

string—quoted with t and n escapes as in JSON (e.g., "Hello World")

number—whole number or decimal number (e.g., 12, 42, or 3.14)

Boolean—true or false null—the constant null

A memory reference may also be an operand. If present, a memory reference operand has the form:

% name—a memory location reference, where the % indicates a memory location and "name" is the key.

5.3. Assembler Primitives

Table 3, below, shows some examples of assembler primitives, modeled as opcodes, in accordance with one or more embodiments. In an embodiment, opcodes that start with an underscore are control opcodes for the assembler, internal to the loader mechanism.

TABLE 3

Example Assembler Primitives

| hex | opcode | category | description |
|---|---|---|---|
| 0x00 | _echo | core | turn echo on |
| 0x01 | load | utils | loads a loader script |
| 0x02 | push | core | pushes value or memory reference on a stack |
| 0x03 | pop | core | pops a value from the stack |
| 0x04 | swap | core | swaps two top stack elements |
| 0x05 | stop | core | stops loading and exist the loader |
| 0x08 | _timing | core | print load file processing time on |
| 0x0a | m_st | core | store the top of the stack to a memory location; pops from stack |
| 0x0b | m_init | core | initializes memory location |
| 0x0c | m_save | core | saves top of the stack to a memory location; does NOT pop stack |
| 0x0e | m_fe | core | fetches memory location; pushes on the stack |
| 0x0f | m_rm | core | removes memory location from memory |
| 0x11 | m_self | core | fetches memory location and stores as 'self' reference |
| 0x13 | self | core | makes top stack element 'self' reference; does not pop |
| 0x14 | c_obj | core | creates object instance by clazz name; push result on stack |
| 0x15 | c_obj_N | core | create object instance by clazz name with N arguments; push result on stack |
| 0x16 | clazz | core | lookup class name; push result on stack |
| 0x19 | call | core | calls a method with 0 arguments against 'self' |
| 0x1a | call_1 | core | calls a method with 1 argument against 'self'; arg on stack |
| 0x1b | call_2 | core | calls a method with 2 arguments against 'self'; args on stack |
| 0x1c | call_3 | core | calls a method with 3 arguments against 'self'; args on stack |

TABLE 3-continued

Example Assembler Primitives

| hex | opcode | category | description |
|---|---|---|---|
| 0x23 | callp | core | calls method with 0 arguments against 'self'; pushes result on stack |
| 0x24 | callp_1 | core | calls method with 1 argument against 'self'; arg on stack; pushes result on stack |
| 0x25 | callp_2 | core | calls method with 2 arguments against 'self'; args on stack; pushes result on stack |
| 0x26 | callp_3 | core | calls method with 3 arguments against 'self'; args on stack; pushes result on stack |
| 0x2d | call_S | core | calls method with 0 argument; self on stack |
| 0x2e | call_1_S | core | calls method with 1 argument; self on stack, arg on stack |
| 0x2f | call_2_S | core | calls method with 2 arguments; self on stack, args on stack |
| 0x30 | call_3_S | core | calls method with 3 arguments; self on stack, args on stack |
| 0x37 | callp_S | core | calls method with 0 arguments; self on satck; pushes result on stack |
| 0x38 | callp_1_S | core | calls method with 1 argument; self on satck; arg on stack; pushes result on stack |
| 0x39 | callp_2_S | core | calls method with 2 arguments; self on stack, args on stack; pushes result on stack |
| 0x3a | callp_3_S | core | calls method with 3 arguments; self on stack, args on stack; pushes result on stack |
| 0x41 | c_qn_1 | utils | creates qn with 1 arg (localname); pushes result on stack |
| 0x42 | c_qn_2 | utils | creates qn with 2 args (localname, ns); pushes result on stack |
| 0x43 | c_qn_3 | utils | creates QN with 3 args (localname, ns, pfx); pushes result on stack |
| 0x46 | c_hashmap | collections | creates a hash map; pushes result on stack |
| 0x47 | c_linkedmap | collections | creates a linked hash map; pushes result on stack |
| 0x48 | c_hashset | collections | creates a hash set; pushes result on stack |
| 0x49 | c_linkedset | collections | creates a linked hash set; pushes result on stack |
| 0x4b | c_arr | collections | creates arraylist; pushes result on stack |
| 0x4c | c_list | collections | creates arraylist; pushes result on stack |
| 0x4f | c_date 1 | utils | creates date object; pushes result on stack |
| 0x55 | i_col_add | collections | calls add( ) method on java collections; arg on stack |
| 0x56 | i_map_put | collections | calls put( ) method on java maps; args on stack |
| 0x57 | i_col_add_S | collections | calls add( ) method on java collections with collection on stack |
| 0x58 | i_map_put_S | collections | calls put( ) method on java maps with map on stack |
| 0x5a | c_argv | utils | creates array from N arguments on stack, based on type of first element; pushes result on stack |
| 0x5b | c_arr_o | utils | creates an Object[ ] array from N arguments on stack; pushes result on stack |
| 0x65 | mul_i | expressions | multiply top 2 integers; push result on stack |
| 0x66 | add_i | expressions | add top 2 integers; push result on stack |
| 0x67 | sub_i | expressions | substract top 2 integers; push result on stack |
| 0x68 | div_i | expressions | divide top 2 integers; push result on stack |
| 0x69 | mod_i | expressions | compute reminder of top 2 integers; push result on stack |
| 0x6e | mul_d | expressions | multiple top 2 numbers (double); push result on stack |
| 0x6f | add_d | expressions | add top 2 numbers (double); push result on stack |
| 0x70 | sub_d | expressions | subtract top 2 numbers (double); push result on stack |
| 0x71 | div_d | expressions | divide top 2 numbers (double); push result on stack |
| 0x78 | and | expressions | boolean AND of top 2 stack elements; push result on stack |
| 0x79 | or | expressions | boolean OR of top 2 stack elements; push result on stack |
| 0x7a | not | expressions | boolean NOT of top 2 stack elements; push result on stack |
| 0x7b | xor | expressions | boolean XOR of top 2 stack elements; push result on stack |
| 0x82 | gt_i | expressions | Compare GT (Greater Than) top 2 integer stack elements; push result on stack |
| 0x83 | gte_i | expressions | Compare GTE (Greater Than or Equal) top 2 integer stack elements; push result on stack |
| 0x84 | lt_i | expressions | Compare LT (Less Than) top 2 integer stack elements; push result on stack |
| 0x85 | lte_i | expressions | Compare LTE (Less Than or Equal) top 2 integer stack elemetns; push result on stack |
| 0x86 | eq_i | expressions | Compare EQ (Equal) top 2 integer stack elements; push result on stack |

TABLE 3-continued

| | | Example Assembler Primitives | |
|---|---|---|---|
| hex | opcode | category | description |
| 0xc8 | c_bpel1_node | bpel | create bpel 1 node based on class name, result on stack |
| 0xc9 | c_iinfo_5 | bpel | create initiation information, with 5 arguments, result on stack |
| 0xca | verify_codegen | bpel | verify codegen version |
| 0xfa | _lpush | core | push the source URI of the script that being loaded; used in 'loaded' scripts only |
| 0xfb | _lpop | core | pop the source URI of the script that being loaded; used in 'loaded' scripts only |
| 0xfd | rem | core | remark/comment section included in script |

In an embodiment, assembler primitives do not include any labels, loops, or conditional statements. Thus, a graph assembly script cannot introduce any infinite loops, conditionals, or infinite goto's or jumps in the object graph assembly process—any of which could significantly impair system resources by introducing delays and consuming disproportionate computing resources. While an object graph itself may include loops and conditionals, it is not necessary for the script that assembles the object graph to include those constructs. The graph assembly script itself executes in a one-way flow, either top-to-bottom or bottom-to-top. A one-way flow helps ensure that graph assembly will either complete or terminate in an error.

5.4. Example Scripts

Table 4, below, shows an example of a script that performs basic arithmetic operations, using assembler primitives as described herein, in accordance with one or more embodiments.

TABLE 4

Example Script

```
; multiply 3 and 7
push 3
mul_i 7                ; multiply
sub_i 9                ; subtract 9
m_st %res_i            ; store in memory 'res_i'
;
push 3
push 7 mul_d push 9 sub_d
m_st %res_d ; store in memory 'res_d'
;
```

In the example above, the script performs the following operations:
store (push) 3 on stack
multiply integer (mul_i) the top of the stack and 7, and store the result on the stack
subtract integer (sub_i) the top of the stack and 9, and store the result on the stack
store in memory (m_st) address res_i
store (push) 3 on stack
store (push) 7 on stack
multiply double (mul_d) the two top arguments on the stack, and store the result on the stack
store (push) 9 on the stack
subtract double (sub_d) the two top argument on the stack, and store the result on the stack
store in memory (m_st) res_d
After execution, the memory locations are:
res_i=12
res_d=12.0

Table 5, below, shows an example of a script that creates a Java QName, using assembler primitives as described herein, in accordance with one or more embodiments.

TABLE 5

Example Script

```
push "http://schemas.xmlsoap.org/ws/2003/03/business-process/" push
"scope_v2"
c_qn_2
m_st %qn_2_v2
```

In the example above, the script performs the following operations:
store (push) "http://schemas.xmlsoap.org/ws/2003/03/business-process/" on the stack
store (push) "scope_v2" on the stack
(create QName with 2 args) (c_qn_2) create a java QName with 2 arguments call; internally, this operation pops the two top stack items, creates the QName, and pushes it onto the stack
memory store—(m_st) store the result (the QName) in memory address qn_2_v2

Table 6, below, shows an example of a script, using assembler primitives as described herein, in accordance with one or more embodiments.

TABLE 6

Example Script

```
; no reflection, via internally registered factory
c_bpel1_node "BPEL1CompensateNode"
self
push "BpCom1"
call_1 "setId"
push "BpCoH1"
call_1 "setParentBlockId"
push 42
call_1 "setLineNumber"
push "BpCoH1"
call_1 "setCompensateContainerBlockId"
;
m_st %bpel_compensate_2
;
```

In the example above, the script performs the following operations:
create BPEL1CompensateNode (c_bpell_node)—create that Java object, store the result on the stack
make the top of the stack the "this" pointer (self) for any subsequent method invocations; stack is not altered
store string (push) "BpCom1" on the stack
call the method "setId" with 1 argument (call_1) using the top argument on the stack as the argument—essentially self.setId ("BpCom1")

store (push) "BpCoH1" on the stack call the method "setParentBlockId" with 1 argument (call_1) using the top argument on the stack as the argument—essentially self. setParentBlockId("Bp-CoH1")

store (push) 42 on the stack call the method "setLineNumber" with 1 argument (call_1) using the top argument on the stack as the argument—essentially self. setLineNumber(42)

store (push) "BpCoH1" on the stack call the method "setCompensateContainerBlockId" with 1 argument (call_1) using the top argument on the stack as the argument—essentially self.setCompensateCon-tainerBlockId("BpCoH1")

memory store (m_st) the top stack element in memory location bpel_compensate_2

5.5. Object Graphs

Figure 7A:
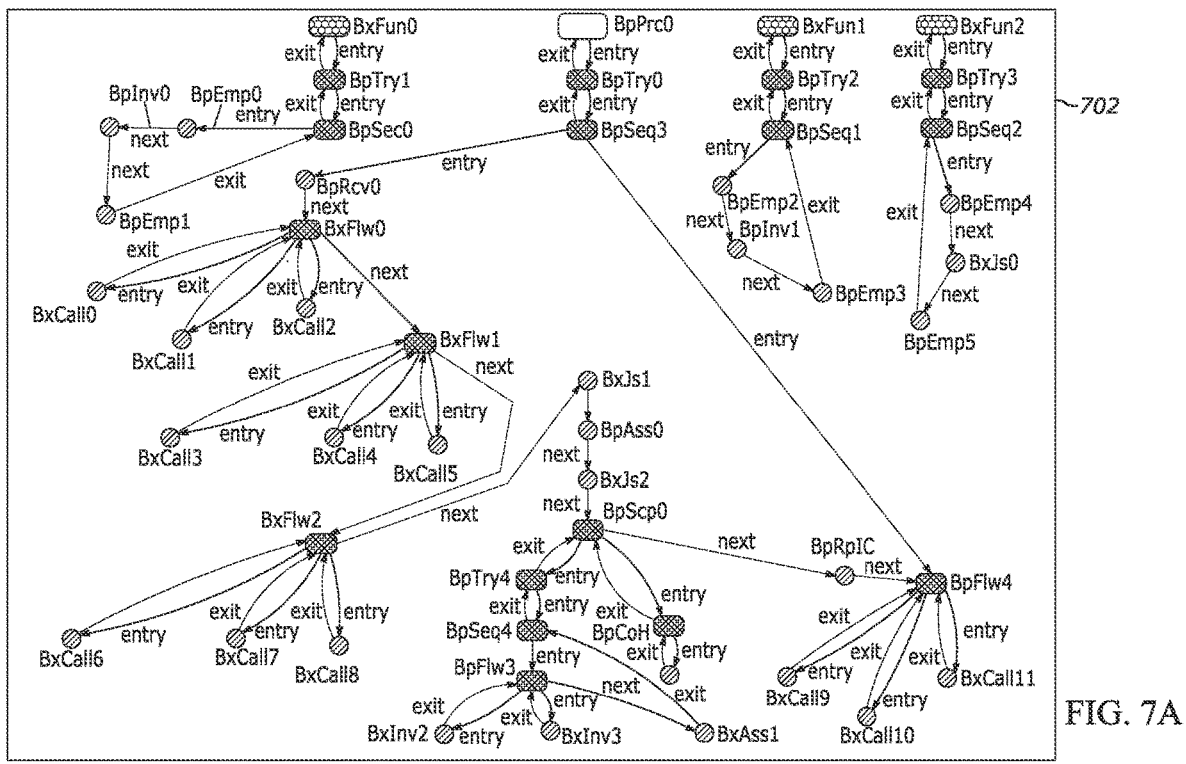
FIGS. 7A-7B illustrate examples of object graphs in accordance with one or more embodiments.
Figure 7B:
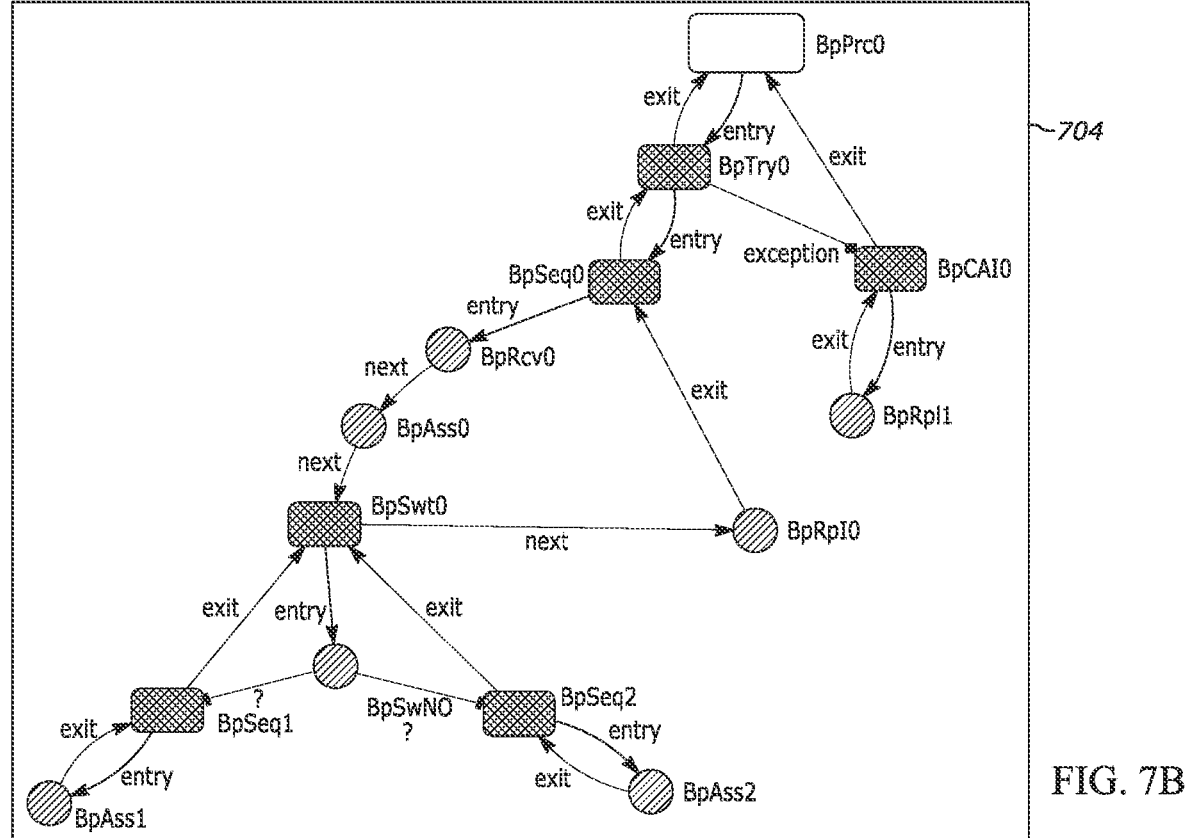

FIGS. 7A-7B illustrate examples of object graphs in accordance with one or more embodiments. Specifically, FIGS. 7A and 7B illustrate visual representations of object graphs 702, 704 assembled by a business process execution engine, based on graph assembly scripts as described herein. Table 7, below, show only a fragment of the graph assembly script used to assemble the object graph 704 illustrated in FIG. 7B. The full script, not included here, has over 1,200 lines.

TABLE 7

| Script Fragment for FIG. 7B |
|---|
| ; Generated Process Execution Map - Please do not modify by hand |
| ; load constants from the symbol table that was generated during compilation load "C_0.load" |
| ; pay attention to memory locations (things that start with %) |
| ; objects pre-stored in memory from the java world: |
| ; cube_map –> the map to which nodes are added |
| ; proc –> the process object itself |
| ; ctx  –> the ctx object |
| ; The process is created in the loader, stored in key proc m_self % proc |
| ; Process or MessageDrivenProcess or EmailDrivenProcess? |
| ; at c.c.c.l.c.template.LoadGenerator.generateConstructor:238 push "2023.7.4.1556.master" |
| call_1 "setBuildVersion" push 0 |
| call_1 "setFlavor" push "19.2" |
| call_1 "setCompilerVersion" |
| ; check compiler stamp. it must match, if not we re-build push % ctx |
| call_1 "validateCompatibility" |
| ; correlation set receives |
| ; correlation subscriptions ... |
| ; Mid process receives ... |
| ; memory "_0" is instance of "Set<String>" m_init %_0 |
| c_hashset 1 m_st %_0 m_self %_0 m_self % proc push %_0 |
| call_1 "setMidProcessReceives" |
| ; javascript includes ... push "jsLib/num2text_en.js" push "jsLib/bad.js" |
| push "jsLib/return.js" push "jsLib/dom.js" c_argv 4 |
| call_1 "setJsImportsVA" |
| ; memory "_1" is instance of "c.c.c.e.e.b.v.blocks.BPELProcessBlock" m_init %_1 |
| ; at c.c.c.l.c.template.MapLoadGenerator.createNodeAndInject:117 |
| ; "c.c.c.l.c.m.bpel.BPELProcess" --> "c.c.c.e.e.b.v.blocks. BPELProcessBlock" c_obj "com.collaxa.cube.engine.ext.bpel.v1.blocks.BPELProcessBlock" |
| self m_st %_1 |
| push "BpPrc0" call_1 "setId" m_fe %_1 |
| m_self % cube_map call_1 "add" m_self %_1 |
| ; at c.c.c.l.c.m.bpel.BPELActivity.injectStandardProperties:487 push 18 |
| call_1 "setLineNumber" push 29 |
| call_1 "setColNumber" push 99 |
| call_1 "setLineNumber2" |
| push "Xpath2JsBridge" call_1 "setName" |
| push "" |
| push "http://schemas.xmlsoap.org/ws/2003/03/business-process/" call_2 "registerNSPrefix" |
| push "bpws" |
| push "http://schemas.xmlsoap.org/ws/2003/03/business-process/" call_2 "registerNSPrefix" |
| push "tns" |
| push "http://samples.otn.com/Xpath2JsBridge" call_2 "registerNSPrefix" |
| push "x" |
| push "http://schemas.oracle.com/bpel/extension" call_2 "registerNSPrefix" |
| push "xsd" |
| push "http://www.w3.org/2001/XMLSchema" call_2 "registerNSPrefix" |
| push "xp" |
| push "http://xmlns.oracle.com/soa/config/xpath" call_2 "registerNSPrefix" |
| push "json" |
| push "http://json.org/" call_2 "registerNSPrefix" push "ns2" |
| push "http://xmlns.oracle.com/" call_2 "registerNSPrefix" |
| push "ns1" |
| push "http://xmlns.oracle.com/ics/bpel/wrapper" call_2 "registerNSPrefix" |
| push "ora" |

TABLE 7-continued

Script Fragment for FIG. 7B

```
push "http://schemas.oracle.com/xpath/extension" call_2 "registerNSPrefix"
; exit tokens: [ ] push true
call_1 "setSuppressJoinFailure"
; at c.c.c.l.c.m.bpel.BPELCompoundActivity.injectSpecializedProperties:314 push
"BpTry0"
c_argv 1
call_1 "setEntryTokensVA"
; at c.c.c.l.c.m.bpel.BPELProcess.injectSpecializedProperties:863
; process runtime uses schema: false push "process"
call_1 "setMethodName" push "not-supported"
call_1 "setTransactionType"
; at c.c.c.l.c.m.bpel.BPELCompoundActivity.writeEntityDefMetadatas:402
; memory "_2" is instance of "c.c.c.e.e.b.v.blocks.BPELTryBlock" m_init %_2
; at c.c.c.l.c.template.MapLoadGenerator.createNodeAndInject:117
; "c.c.c.l.c.m.bpel.XTryBlox" --> "c.c.c.e.e.b.v.blocks.BPELTryBlock" c_obj
"com.collaxa.cube.engine.ext.bpel.v1.blocks.BPELTryBlock"
self m_st %_2
push "BpTry0" call_1 "setId" push "BpPrc0"
call_1 "setParentBlockId" m_fe %_2
m_self % cube_map call_1 "add" m_self %_2
; at c.c.c.l.c.m.bpel.BPELActivity.injectStandardProperties:487 push 18
call_1 "setLineNumber" push 18
call_1 "setLineNumber2"
; exit tokens: [BpPrc0, null, null] push "BpPrc0"
c_argv 1
call_1 "setExitTokensVA"
push true
call_1 "setSuppressJoinFailure"
; at c.c.c.l.c.m.bpel.BPELCompoundActivity.injectSpecializedProperties:314 push
"BpSeq0"
c_argv 1
call_1 "setEntryTokensVA"
; at c.c.c.l.c.m.bpel.XTryBlox.injectSpecializedProperties:113 push false
call_1 "setHasEventHandlers" push null
push null push "BpCAI0"
call_3 "addCatchTransition"
; memory "_3" is instance of "c.c.c.e.e.b.v.blocks.BPELSequenceBlock" m_init %_3
; at c.c.c.l.c.template.MapLoadGenerator.createNodeAndInject:117
; "c.c.c.l.c.m.bpel.SequenceBlox" --> "c.c.c.e.e.b.v.blocks.BPELSequenceBlock" c_obj
"com.collaxa.cube.engine.ext.bpel.v1.blocks.BPELSequenceBlock"
self m_st %_3
push "BpSeq0" call_1 "setId" push "BpTry0"
call_1 "setParentBlockId" m_fe %_3
m_self % cube_map call_1 "add" m_self %_3
; at c.c.c.l.c.m.bpel.BPELActivity.injectStandardProperties:487 push 46
call_1 "setLineNumber" push 25
call_1 "setColNumber" push 98
call_1 "setLineNumber2" push "main"
call_1 "setName"
; exit tokens: [BpTry0, null] push "BpTry0"
c_argv 1
call_1 "setExitTokensVA" push true
call_1 "setSuppressJoinFailure"
; at c.c.c.l.c.m.bpel.BPELCompoundActivity.injectSpecializedProperties:314 push
"BpRcv0"
c_argv 1
call_1 "setEntryTokensVA"
; memory "_4" is instance of "c.c.c.e.e.b.v.nodes.BPEL1ReceiveNode" m_init %_4
; at c.c.c.l.c.template.MapLoadGenerator.createNodeAndInject:117
; "c.c.c.l.c.m.bpel.ReceiveNode" --> "c.c.c.e.e.b.v.nodes.BPEL1ReceiveNode" c_obj
"com.collaxa.cube.engine.ext.bpel.v1.nodes.BPEL1ReceiveNode"
self m_st %_4
push "BpRcv0" call_1 "setId" push "BpSeq0"
call_1 "setParentBlockId" m_fe %_4
m_self % cube_map call_1 "add" m_self %_4
; at c.c.c.l.c.m.bpel.BPELActivity.injectStandardProperties:487 push 48
call 1 "setLineNumber" push 113
call_1 "setColNumber" push 48
call_1 "setLineNumber2"
push "receiveInput" call_1 "setName"
; exit tokens: [BpAss0] push "BpAss0"
c_argv 1
call_1 "setExitTokensVA" push true
call_1 "setSuppressJoinFailure"
; at c.c.c.l.c.m.bpel.PartnerActivity.injectSpecializedProperties:223 push "client"
call_1 "setPartnerLinkName" push "start"
call_1 "setOperationName"
; memory "_5" is instance of "Collection<ICXVariableMeta>" m_init %_5
```

TABLE 7-continued

Script Fragment for FIG. 7B

```
c_list 1 m_st %_5 m_self %_5 push "input" push 1
push %Q_data_0 c_arr_o 3
c_obj_N "com.collaxa.cube.engine.ext.common.VarMeta" call_1 "add"
m_self %_4 push %_5
call_1 "setInputVariables"
; at c.c.c.l.c.m.bpel.ReceiveNode.injectSpecializedProperties:166 push true
call_1 "setIsCreateInstance" push true
call_1 "setIsTwoWay" push false
call_1 "setIsVariableReadOnly"
;         middle clipped .....
;         middle clipped .....
; memory "_15" is instance of "c.c.c.e.e.b.v.nodes.BPEL1ReplyNode" m_init %_15
; at c.c.c.l.c.template.MapLoadGenerator.createNodeAndInject:117
; "c.c.c.l.c.m.bpel.ReplyNode" --> "c.c.c.e.e.b.v.nodes.BPEL1ReplyNode" c_obj
"com.collaxa.cube.engine.ext.bpel.v1.nodes.BPEL1ReplyNode"
self
m_st %_15 push "BpRpl0"
call_1 "setId" push "BpSeq0"
call_1 "setParentBlockId" m_fe %_15
m_self % cube_map call_1 "add" m_self %_15
; at c.c.c.l.c.m.bpel.BPELActivity.injectStandardProperties:487 push 97
call_1 "setLineNumber" push 66
call_1 "setColNumber" push 97
call_1 "setLineNumber2" push "reply"
call_1 "setName"
; exit tokens: [BpSeq0] push "BpSeq0"
c_argv 1
call_1 "setExitTokensVA" push true
call_1 "setSuppressJoinFailure" push "output"
c_argv 1
call_1 "setEarlyPurgeVariables"
; at c.c.c.l.c.m.bpel.PartnerActivity.injectSpecializedProperties:223 push "client"
call_1 "setPartnerLinkName" push "start"
call_1 "setOperationName" c_list 1
m_st %_5 m_self %_5 push "output" push 1
push %Q_data_0 c_arr_o 3
c_obj_N "com.collaxa.cube.engine.ext.common.VarMeta" call_1 "add"
m_self %_15 push %_5
call_1 "setInputVariables"
; at c.c.c.l.c.m.bpel.ReplyNode.injectSpecializedProperties:66 push "start"
c_argv 1
call_1 "setOperationsVA"
; reply status to be set (−1 for unknown)
push −1
call_1 "setStatus"
; memory "_16" is instance of "c.c.c.e.e.b.v.blocks.BPELCatchAllBlock" m_init %_16
; at c.c.c.l.c.template.MapLoadGenerator.createNodeAndInject:117
; "c.c.c.l.c.m.bpel.CatchAllBlox" --> "c.c.c.e.e.b.v.blocks.BPELCatchAllBlock" c_obj
"com.collaxa.cube.engine.ext.bpel.v1.blocks.BPELCatchAllBlock"
self
m_st %_16 push "BpCAI0"
call_1 "setId" push "BpPrc0"
call_1 "setParentBlockId" m_fe %_16
m_self % cube_map call_1 "add" m_self %_16
; at c.c.c.l.c.m.bpel.BPELActivity.injectStandardProperties:487 push 18
call_1 "setLineNumber"
push "mcube-default-catchAll" call_1 "setName"
; exit tokens: [BpPrc0, null] push "BpPrc0"
c_argv 1
call_1 "setExitTokensVA" push true
call_1 "setSuppressJoinFailure"
; at c.c.c.l.c.m.bpel.BPELCompoundActivity.injectSpecializedProperties:314 push
"BpRpl1"
c_argv 1
call_1 "setEntryTokensVA"
; at c.c.c.l.c.template.MapLoadGenerator.createNodeAndInject:117
; "c.c.c.l.c.m.bpel.ReplyNode" --> "c.c.c.e.e.b.v.nodes.BPEL1ReplyNode" c_obj
"com.collaxa.cube.engine.ext.bpel.v1.nodes.BPEL1ReplyNode"
self
m_st %_15 push "BpRpl1"
call_1 "setId" push "BpCAI0"
call 1 "setParentBlockId" m_fe %_15
m_self % cube_map call_1 "add" m_self %_15
; at c.c.c.l.c.m.bpel.BPELActivity.injectStandardProperties:487 push 18
call_1 "setLineNumber"
; exit tokens: [BpCAI0] push "BpCAI0"
c_argv 1
call_1 "setExitTokensVA" push true
```

TABLE 7-continued

Script Fragment for FIG. 7B

```
call__1 "setSuppressJoinFailure"
; at c.c.c.l.c.m.bpel.PartnerActivity.injectSpecializedProperties:223 push "client"
call__1 "setPartnerLinkName" c__list 1
m__st %__5 m__self %__5 push "output" push 3
push % Q      http__json__org__any__3
c__arr__o 3
c__obj__N "com.collaxa.cube.engine.ext.common.VarMeta" call__1 "add"
m__self %__15 push %__5
call__1 "setInputVariables"
; at c.c.c.l.c.m.bpel.ReplyNode.injectSpecializedProperties:66
; ;reply status to be set (−1 for unknown)
push −1
call__1 "setStatus" push %Q__current__6 call__1 "setFaultName"
push "start" push "client" push null push null push false c__iinfo__5 push false
call__1__S "setAmbiguous" push false
call__1__S "setAcked" push false
call__1__S "setOneWay" c__argv 1
m__self % proc
call__1 "setInitiationInfo"
; nodes-n-blocks: 14
; gen-classes: 0
; direct-use-classes: 14
; --- end of file ----
```

6. Practical Applications, Advantages, and Improvements

One or more embodiments allow for code extensions in the absence of class loaders and serialization/deserialization. Thus, one or more embodiments retain code extensibility even when those code extension facilities are not available. This allows for code extensions even when the running program was compiled to native instructions (e.g., using an AOT compiler), which allows for the performance benefits of using native instructions without losing the ability to extend the running program.

7. Computer Networks and Cloud Networks

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant identifier (ID). Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Alternatively or additionally, each data structure and/or dataset, stored by the computer network, is tagged with a tenant ID. A tenant is permitted access to a particular application, data structure, and/or dataset only if the tenant and the particular data structure and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using HyperText Transfer Protocol (HTTP) messages and/or according to other communication protocols via Application Programming Interface (API) endpoints. Microservices may be managed and updated separately, written in different languages, and may be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

8.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

In an embodiment, the trigger, when satisfied, may output data for consumption by the target microservice. In another embodiment, the trigger, when satisfied, outputs a binary value indicating that the trigger has been satisfied, and/or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

8.2. Actions

In an embodiment, a plugged-in microservice application may expose actions to the microservices manager. The exposed actions may receive, as input, data or an identification of a data object or location of data that causes data to be moved into a data cloud.

In an embodiment, the exposed actions may receive, as input, a request to increase or decrease existing alert thresholds. The input may identify existing in-application alert thresholds and whether to increase, decrease, or delete the threshold. Alternatively or additionally, the input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing device(s) may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 8:
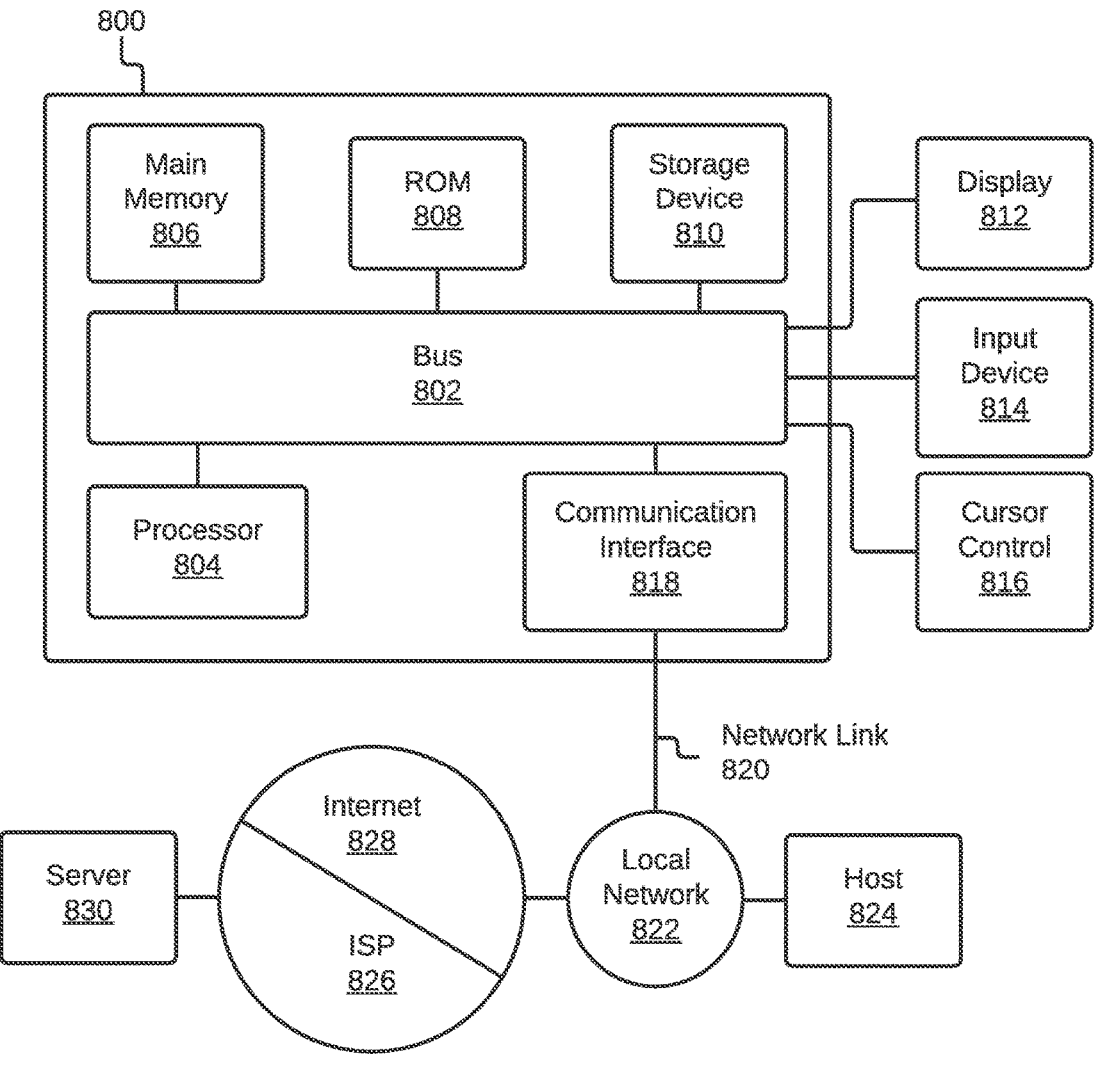
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to the processor 804, render computer system 800 into a special-purpose machine that is customized to perform the operations specified in the instructions.

Computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware, and/or program logic which in combination with computer system 800 causes or programs computer system 800 to be a special-purpose machine. In an embodiment, the techniques herein are performed by computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 810. Volatile media includes dynamic memory, such as the main memory 806. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of bus 802. Transmission media can also take the form of acoustic or light waves, such as those generated during radio wave and infrared data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its dynamic memory and send the instructions over a telephone line or other communications medium, using a modem. A modem local to computer system 800 can receive the data on the telephone line or other communications medium and use an infrared transmitter to convert the data to an infrared signal. An infrared detector can receive the data carried in the infrared signal and appropriate circuitry can place the data on the bus 802. The bus 802 carries the data to the main memory 806, from which the processor 804 retrieves and executes the instructions. The instructions received by the main memory 806 may optionally be stored on the storage device 810, either before or after execution by processor 804.

Computer system 800 also includes a communication interface 818 coupled to the bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card configured to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through a local network 822 to a host computer 824 or to data equipment operated by an Internet Service Provider (ISP) 826. The ISP 826 in turn provides data communication services through the world wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820, and communication interface 818. In the Internet example, a server 830 might transmit a requested code for an application program through the Internet 828, ISP 826, local network 822, and communication interface 818.

The received code may be executed by processor 804 as it is received, and/or may be stored in the storage device 810 or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:

generating, based on a data structure that defines a business process, a script comprising instructions for assembling an object graph that represents relationships between objects used by the business process;

obtaining, at runtime by a business process execution engine compiled to native instructions by an ahead-of-time compiler, the script;

assembling, at runtime by the business process execution engine, the object graph based at least on the instructions in the script.

2. The one or more non-transitory computer-readable media of claim 1, the operations further comprising:

executing, at runtime by the business process execution engine, the business process based at least on the object graph.

3. The one or more non-transitory computer-readable media of claim 1, the operations further comprising:

obtaining source code, written in a non-native programming language, that defines the business process execution engine;

compiling, by the ahead-of-time compiler, the source code to obtain the business process execution engine compiled to native instructions.

4. The one or more non-transitory computer-readable media of claim 3, wherein the non-native programming language is Java.

5. The one or more non-transitory computer-readable media of claim 1:

wherein the script comprises a plurality of opcodes corresponding to the instructions for assembling the object graph;

wherein the business process execution engine is configured to execute the plurality of opcodes using a state machine that is internal to the business process execution engine.

6. The one or more non-transitory computer-readable media of claim 1, wherein the business process is a user-defined workflow.

7. The one or more non-transitory computer-readable media of claim 1, wherein the data structure that defines the business process is written in a semi-structured markup language.

8. A system comprising:

one or more hardware processors;

one or more non-transitory computer-readable media; and program instructions stored on the one or more non-transitory computer readable media which, when executed by the one or more hardware processors, cause the system to perform operations comprising:

generating, based on a data structure that defines a business process, a script comprising instructions for assembling an object graph that represents relationships between objects used by the business process;

obtaining, at runtime by a business process execution engine compiled to native instructions by an ahead-of-time compiler, the script;

assembling, at runtime by the business process execution engine, the object graph based at least on the instructions in the script.

9. The system of claim 8, the operations further comprising:

executing, at runtime by the business process execution engine, the business process based at least on the object graph.

10. The system of claim 8, the operations further comprising:

obtaining source code, written in a non-native programming language, that defines the business process execution engine;

compiling, by the ahead-of-time compiler, the source code to obtain the business process execution engine compiled to native instructions.

11. The system of claim 10, wherein the non-native programming language is Java.

12. The system of claim 8:

wherein the script comprises a plurality of opcodes corresponding to the instructions for assembling the object graph;

wherein the business process execution engine is configured to execute the plurality of opcodes using a state machine that is internal to the business process execution engine.

13. The system of claim 8, wherein the business process is a user-defined workflow.

14. The system of claim 8, wherein the data structure that defines the business process is written in a semi-structured markup language.

15. A method comprising:

generating, based on a data structure that defines a business process, a script comprising instructions for assembling an object graph that represents relationships between objects used by the business process;

obtaining, at runtime by a business process execution engine compiled to native instructions by an ahead-of-time compiler, the script;

assembling, at runtime by the business process execution engine, the object graph based at least on the instructions in the script;

wherein the method is performed by at least one device including a hardware processor.

16. The method of claim 15, further comprising:

executing, at runtime by the business process execution engine, the business process based at least on the object graph.

17. The method of claim 15, further comprising:

obtaining source code, written in a non-native programming language, that defines the business process execution engine;

compiling, by the ahead-of-time compiler, the source code to obtain the business process execution engine compiled to native instructions.

18. The method of claim 17, wherein the non-native programming language is Java.

19. The method of claim 15:

wherein the script comprises a plurality of opcodes corresponding to the instructions for assembling the object graph;

wherein the business process execution engine is configured to execute the plurality of opcodes using a state machine that is internal to the business process execution engine.

20. The method of claim 15, wherein the business process is a user-defined workflow.

\* \* \* \* \*